Fig. 1.

Inventor
FRANZ J. HERBSTHOFER

Feb. 9, 1971  F. J. HERBSTHOFER  3,561,198
ADJUSTABLE HARVESTER TABLE
Filed Aug. 21, 1968  12 Sheets-Sheet 2

Inventor
FRANZ J. HERBSTHOFER
By Tweedale & Gerhardt
Attorneys

Feb. 9, 1971　　　F. J. HERBSTHOFER　　　3,561,198
ADJUSTABLE HARVESTER TABLE
Filed Aug. 21, 1968　　　　　　　　　　　　　12 Sheets-Sheet 4

Inventor
FRANZ J. HERBSTHOFER
By Tweedale & Gerhardt
Attorneys

Inventor
FRANZ J. HERBSTHOFER
By Tweedale & Gerhardt
Attorneys

Feb. 9, 1971 F. J. HERBSTHOFER 3,561,198
ADJUSTABLE HARVESTER TABLE
Filed Aug. 21, 1968 12 Sheets-Sheet 11

INVENTOR.
FRANZ J. HERBSTHOFER
BY
Tweedale & Gerhardt
ATTORNEYS.

United States Patent Office 3,561,198
Patented Feb. 9, 1971

3,561,198
ADJUSTABLE HARVESTER TABLE
Franz J. Herbsthofer, Kassel-Harleshausen, Germany, assignor to Massey-Ferguson G.m.b.H., Kassel-Standeplatz, Germany, a corporation of Germany
Filed Aug. 21, 1968, Ser. No. 756,732
Claim priority, application Great Britain, Aug. 31, 1967, 39,795/67; Nov. 10, 1967, 51,170/67; May 4, 1968, 21,249/68
Int. Cl. A01d 41/02
U.S. Cl. 56—20
23 Claims

ABSTRACT OF THE DISCLOSURE

An adjustable width combine header with a table, a cutter bar assembly, an auger to convey crop material and a reel. The table, the auger assembly and the reel have telescopic sections to allow lateral width-adjustment. Sections of the cutter bar assembly have to be added or removed to adjust the width of the cutter bar assembly.

---

This invention relates to crop-collecting tables or headers which are located at the front of mobile harvesting machines and which are usually substantially wider than the body of the machine. More especially the invention relates to a header for a combine harvester, hereinafter referred to as a "combine."

A combine header consists generally of a table or casing mounted at the front of the combine and having a floor, end walls, and a rear wall with a feed opening, crop gathering means or a reel, and crop conveying means or an auger, all extending of the table. If the combine header must cut the crop, a cutter bar assembly is included and is coextensive with the table. For road travel, the width of the table is inconvenient or even dangerous and to avoid this disadvantage it is known to remove the header from the combine and to transport it endwise on a trailer. Also, it is known to provide headers which can be folded upwards about a fore and aft axis to reduce the width for road travel. The former arrangement is time consuming and laborious, and involves detaching the header, and the requirement for a special trailer. The latter arrangement has a disadvantage in that the folded header restricts the field of vision of the combine driver.

An object of the present invention is to provide a header in which these disadvantages are obviated or mitigated.

According to the present invention we provide a header for a harvester, in which the table, crop gathering means, and crop conveying means are width-adjustable so that the header width may be adjusted to provide a contracted road transport condition.

Further, according to the present invention we provide for use with a header as aforesaid, a reel having parts which can be telescoped in order to alter the length thereof.

Still further, according to the present invention we provide for use with a header as aforesaid, an auger having parts which can be telescoped in order to adjust the length thereof.

Embodiments of the invention will now be described, by way of example, with reference to the accompanying diagrammatic drawings, in which.

Referring to FIGS. 1 to 10, a header H consists generally of a table T, a reel R, a cutter-bar assembly C and an auger A.

Figure 1:
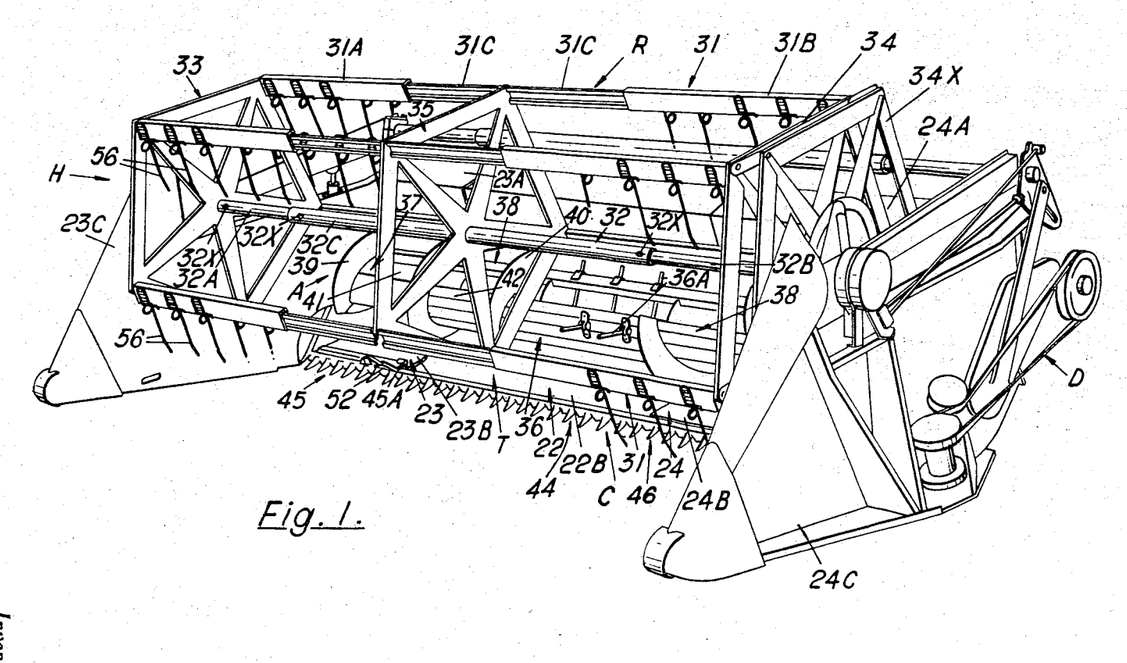
FIG. 1 is a front perspective view of one embodiment of a combine header according to the present invention and in an extended condition.
Figure 2:
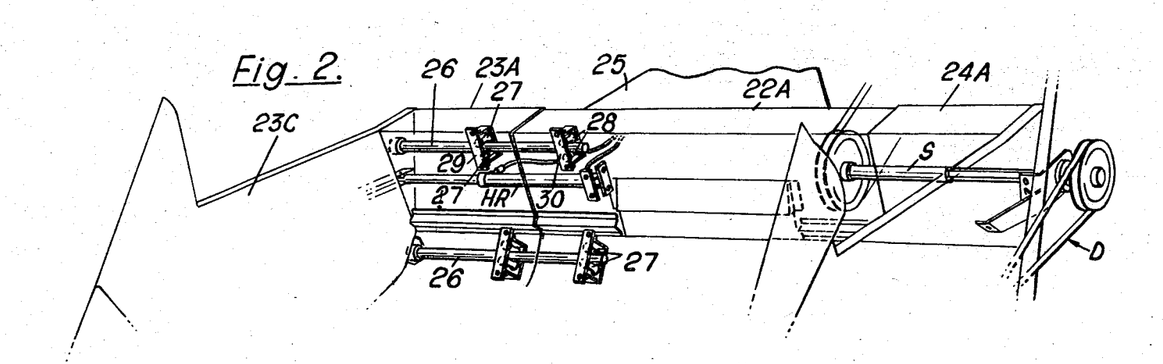
FIG. 2 is a fragmentary view corresponding to FIG. 1 and showing only a portion of the table.

The table is formed in three portions, a main or intermediate portion 22, and opposed end portions 23, 24. The portion 22 has a rear wall 22A and a floor 22B and is secured to an elevator casing 25, and the end portions 23, 24 have rear walls 23A, 24A, floors 23B, 24B and end walls 23C, 24C respectively. The end portions 23, 24 are slideably mounted on the portion 22 so that the width of the table is adjustable between the fully extended position shown and a fully contracted position in which the end portions 23, 24 are pushed inwards and their end walls 23C, 24C abut the opposed ends of the portion 22. In the fully contracted position, the width of the header is suitable for road transport.

The end portions 23 and 24 are mounted slideably relative to the portion 22 of the table T in a similar manner which will now be described with reference to the portion 23. The latter has two spaced horizontal rods 26 secured at one end to the end wall 23C and the rods 26 pass slideably between two spaced pairs of rollers 27, 28 carried by brackets 29, 30 secured to the portion 22. A drive shaft S for a drive D to the cutter-bar C is also telescopic. Hydraulic rams HR, one at each end of the table T, are provided for effecting contraction and extension of the table T.

The reel R has a plurality of composite bars 31 which are circumferentially interspaced about and are radially spaced from a composite shaft 32 mounted on the end walls 23C, 24C. The shaft 32 is telescopic and is formed by two outer shafts 32A, 32B and an intermediate hollow shaft 32C within which the shafts 32A, 32B are slideable. The shafts 32A, 32B are secured to end spiders 33, 34, and the shaft 2C is secured to a spider 35 intermediate the spiders 33, 34. The spiders 33, 34, 35 support the composite bars 31, the latter having end parts 31A, 31B secured respectively to the spiders 33, 34 and an intermediate part 31C secured to the spider 35. The bars 31A, 31B are slideably mounted on the bars 31C so that the width of the reel R may be adjusted, and the manner of mounting will be described later.

The auger A also is width-adjustable, as will now be described. The auger A consists of a mid-portion 36 having tines 36A for feeding cut crop to the conveyor 25, an outer end portion 37 at each end, and an inner end portion 38 between the portions 36 and 37. Each portion 37 has a flight 39, and each portion 38 has a flight 40, and the axially inner end of the flight 39 overlaps the axially outer end of the flight 40 to the side nearer the portion 38, so as to permit telescoping. Each portion 37 has circumferentially spaced hub parts 41 which are slideable between similar hub parts 42 on the portion 38. The flights at opposite ends of the auger A are, of course, to opposite hands.

Figure 7:
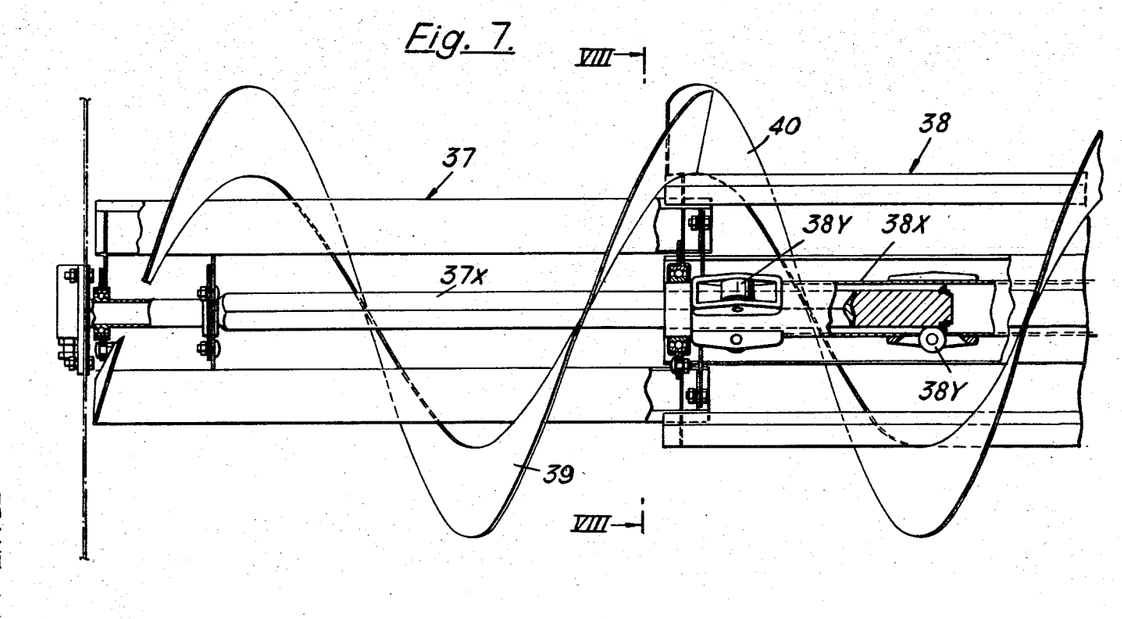
FIG. 7 is a fragmentary view, partly in section, and to an enlarged scale, of a modification of the auger of the header shown in FIG. 1.
Figure 8:
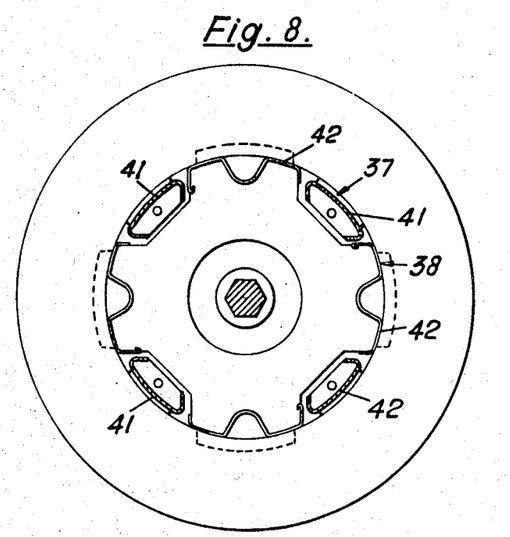
FIG. 8 is a cross sectional view on the line VIII—VIII of FIG. 7.
Figure 9:
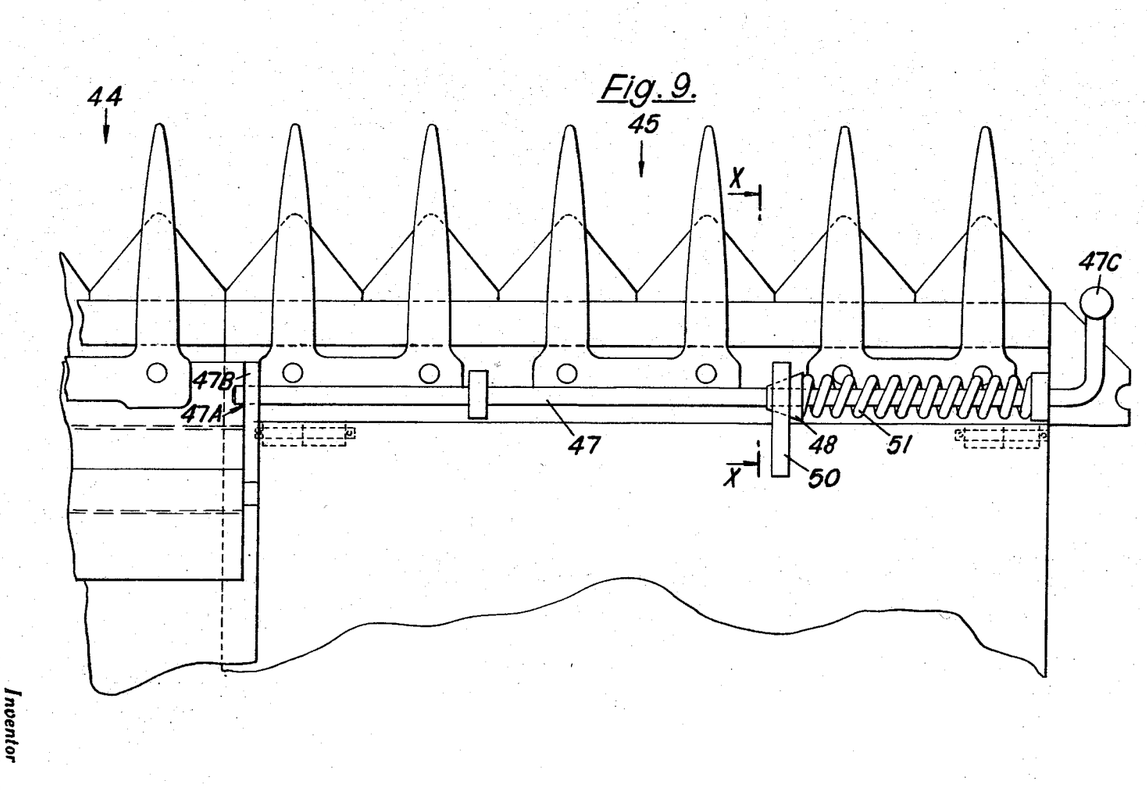
FIG. 9 is a fragmentary underneath plan view of the cutter-bar assembly of the header shown in FIG. 1, to an enlarged scale.
Figure 10:
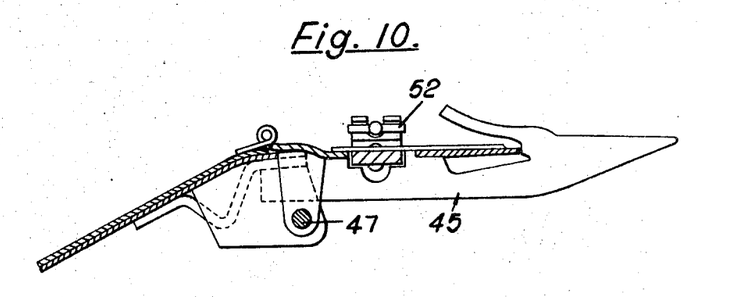
FIG. 10 is a sectional view on the line X—X of FIG. 9.

Referring now to FIGS. 7 and 8, the auger portions 36, 38 are preferably mounted on a hollow shaft 38X, and the auger portion 37 on hexagonal shafts 37X. The shaft 38X carries a plurality of groups of three rollers 38Y, and the rollers in each group bear on alternate faces of the shafts 37X. This facilitates telescoping of the shaft by reducing friction, and provides a positive driving connection between the shafts 37X, 38X.

The cutter bar C will now be described with reference to FIGS. 1, 3, 9 and 10. The cutter bar C is a composite bar formed by cutter bars 44, 45, 46 respectively mounted on the floors 22B, 23B, 24B of the table T. The bars 45, 46 are each mounted in the same manner as will now be described with reference to the bar 45. The bar 45 is pivotally mounted at 45A on the floor of the portion 23 and is normally locked in position by a rod 47. One end of the rod 47 engages a hole 47A in a bracket 47B mounted on the part 22. The rod 47 also carries a conical lock 48 which engages in an eye 49 in a bracket 50 under pressure of a spring 51.

Figure 3:
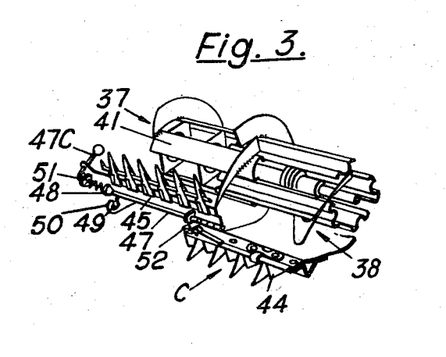
FIG. 3 is a fragmentary perspective detail view.

When it is desired to move the cutter bar 45 to the out-of-use position shown in FIG. 3, so that the header can be telescoped, a crank end 47C on the rod 47 which forms a handle is pulled to the left as viewed in FIG. 3 to withdraw the end of the rod from the hole 47A and the conical lock 48 from the eye 49. The handle 47C is then rotated and is engaged in a notch provided on the end of the cutter bar 45 to hold it in the unlocked position. A knife clip 52, which joins the sections of the knife which respectively operate over the bars 44, 45, is then unlocked and the part of the knife for the bar 45 is then pulled back slightly to prevent interference with the fingers of the bar 44, and the bar is then swung upwardly to the position shown in FIG. 3.

Dealing more fully with the reel, this is of the universal type, that is, it is of the type in which the cross bars pivot on the end spiders and carry fingers, and at one end of the reel there is a control which normally includes a further spider 34X mounted eccentric to the reel-carrying spider to form in effect a cam control of the attitude of the fingers by pivoting the cross members as the reel rotates.

Figures 4, 6:
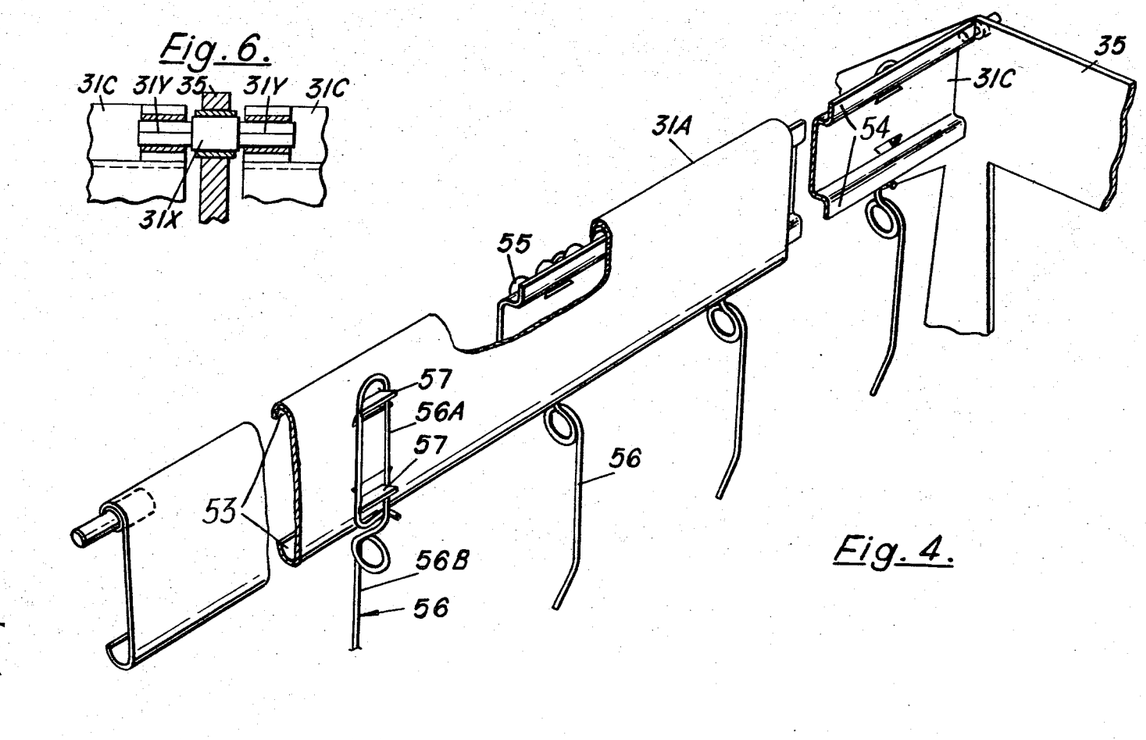
FIG. 4 is a fragmentary perspective view of a bar of the reel of the header to an enlarged scale.
FIG. 6 is a sectional view showing a detail of FIG. 4 to an enlarged scale.
Figure 5:
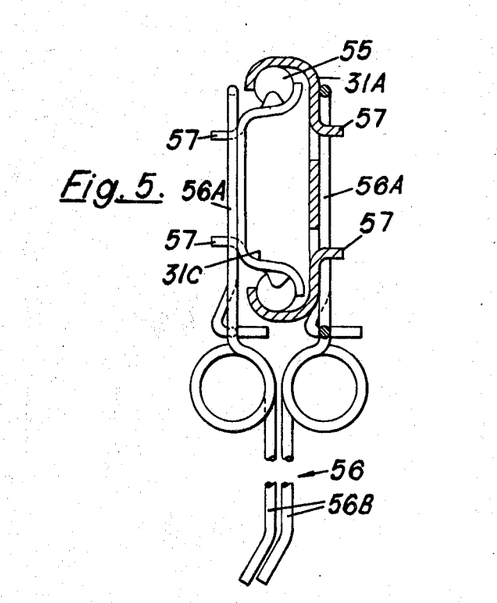
FIG. 5 is a cross sectional view corresponding to FIG. 4.

The bars 31 will now be described with reference to FIGS. 4 and 5 and with reference to the parts 31C and 31A, the part 31B being similar to the part 31A. The parts 31A and 31C are of channel section with in-turned flanges 53 and out-turned flanges 54 respectively. The part 31C fits within the part 31A, and ball bearings 55 are located in spaces between the parth 31A, 31C so as to facilitate sliding of the part 31A relative to the part 31C. Each bar 31 is pivotally mounted on the spiders 33, 34, 35 so that, during rotation of the reel R, tines 56 on the bars 31A, 31C remain substantially vertical. The bars 31A, 31C are made of metal and each has longitudinally spaced pairs of vertically spaced lugs 57, one pair for each tine 56. The lugs have side walls convergent towards the parts 31A, 31C and each tine 56 has a loop 56A which is sprung over the lugs 57 to the position shown, and the shanks 56B of the tines 56 are substantially in alignment.

The bar parts 31C are connected through the spider 35 by pins which are pivotal in the spider 35 and at their ends are rigidly connected to the bar parts. Thus, as shown in FIG. 6, each of said pins has a mid portion 31X pivotally located in a bush or end portion 31Y on the spider 35, and each end portion 31Y of the pin is of square cross section and engages in a square socket in the adjacent ends of the bar portions 31C.

In order to ensure that the reel R remains in each position to which it is adjusted, the shaft parts 32A, 32B, 32C are provided with holes 32X which come into register in each position, and pins are inserted into the holes.

With reference to FIGS. 11 to 17, only those parts which are different from the embodiment described with reference to FIGS. 1 to 10 will be described.

It is sometimes sufficient to have only one telescopic end to the header, this providing sufficient reduction of the width with narrower headers.

Figure 11:
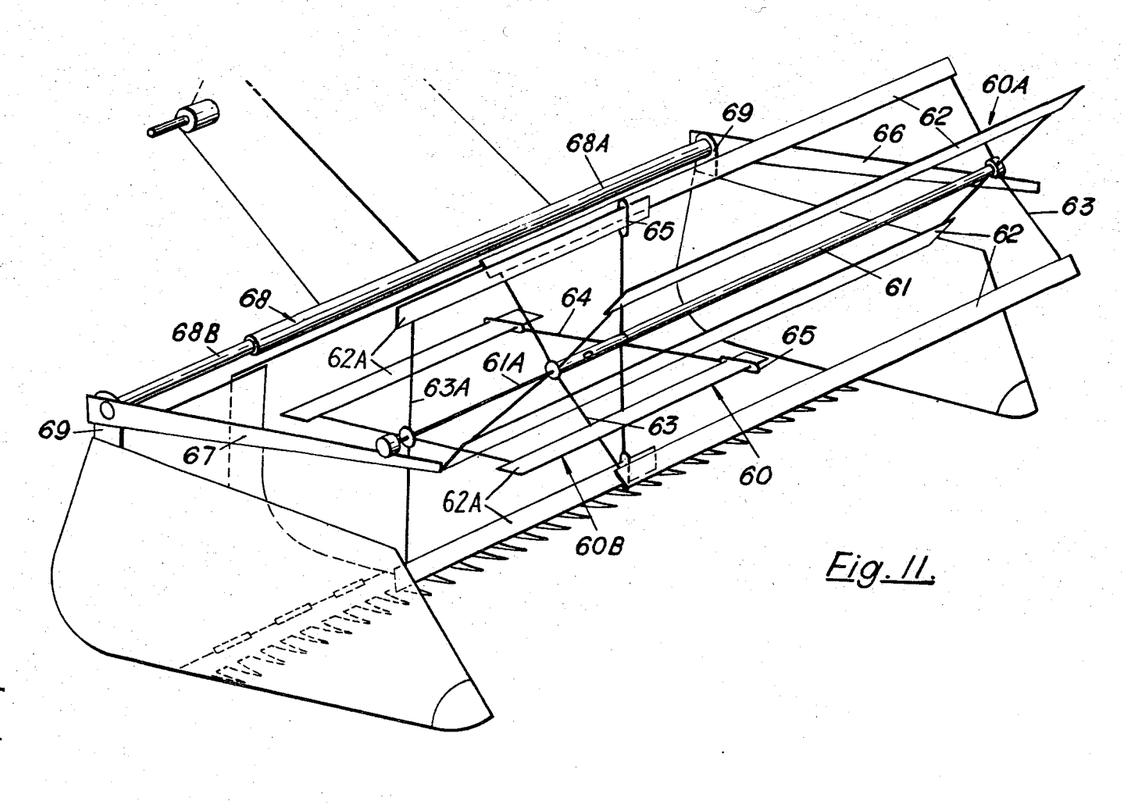
FIG. 11 is a perspective view of a second embodiment of a header according to the present invention, with the auger omitted.

In the second embodiment shown in FIG. 11, only one end of the header is movable relative to a main part to effect width adjustment, and its reel 60 is a simple or so-called bat reel.

The reel 60 is in two portions, a main portion 60A and an end portion 60B. The main portion 60A has a central shaft 61 carrying reel bars 62 on spiders 63 secured to the shaft 61. The end portion 60B is similar to but shorter than the portion 60A and has a control shaft 61A and reel bars 62A on a spider 63A. The shaft 61 is tubular and the shaft 61A is axially slideable therein. The shaft 61 has a further spider 64 secured thereto, and the spider 64 has, at the outer ends of its arms, eyes 65 in which the adjacent end portion of the bars 62A are slideably guided. The outer ends of the shafts 61, 61A are supported by arms 66, 67 respectively which are pivotal so as to permit the usual height adjustment of the reel 60.

The arms 66, 67 are secured to the outer ends of portions 68A, 68B, of a telescopic shaft 68 which, in use, is supported on the combine. The shaft 68 is pivotally mounted on brackets 69 on the table. As shown, the spiders 63A and 64 and the reel bars 62A are angularly spaced from the spiders 63 and the reel bars 62 through approximately 45°. However, this angular spacing is not essential and the eyes for the bars 62A may be carried by the bars 62.

Figure 12:
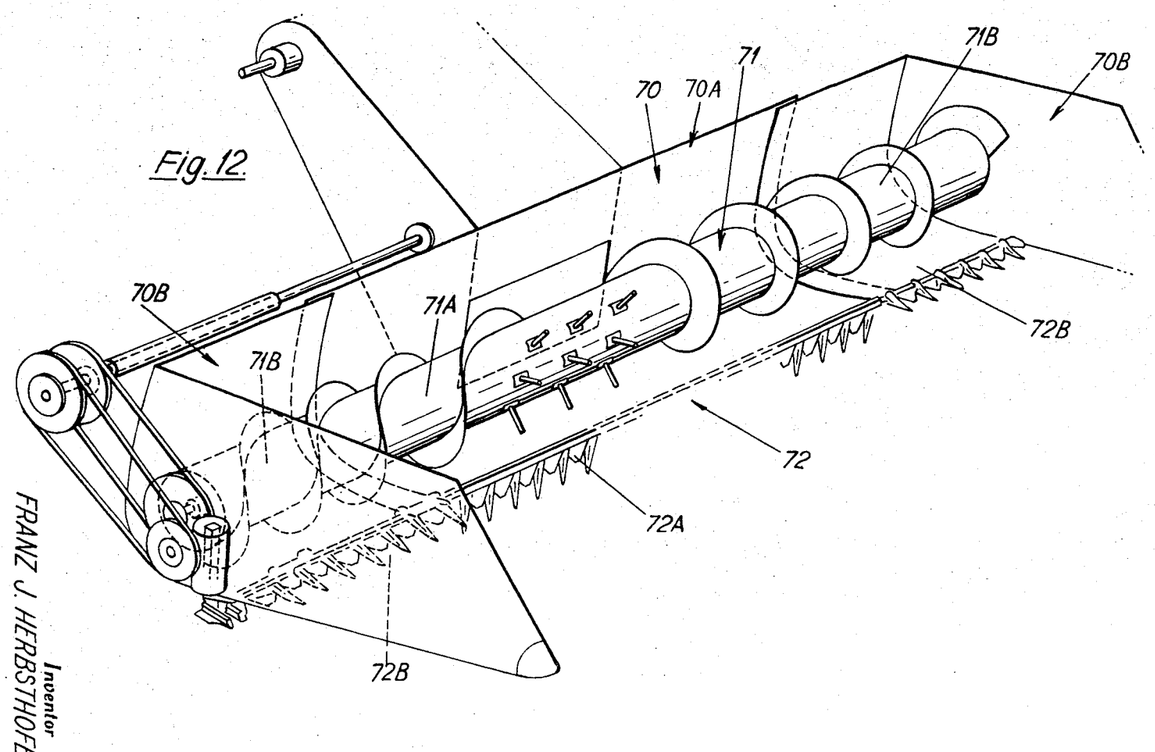
FIG. 12 is a perspective view of a third embodiment, with the reel omitted.

The third embodiment, FIG. 12, is shown very diagrammatically, but is generally similar to the embodiment shown in FIG. 1, its table 70 having a main or intermediate portion 70A, and opposed end portions 70B, its auger 71 having corresponding main and end portions 71A, 71B, and its cutter bar 72 having corresponding main and end portions 72A, 72B. In this embodiment, the main portion 72A of the cutter bar hinges downwardly clear of the portion 72B to the position shown to permit contraction of the width of the header.

Figure 13:
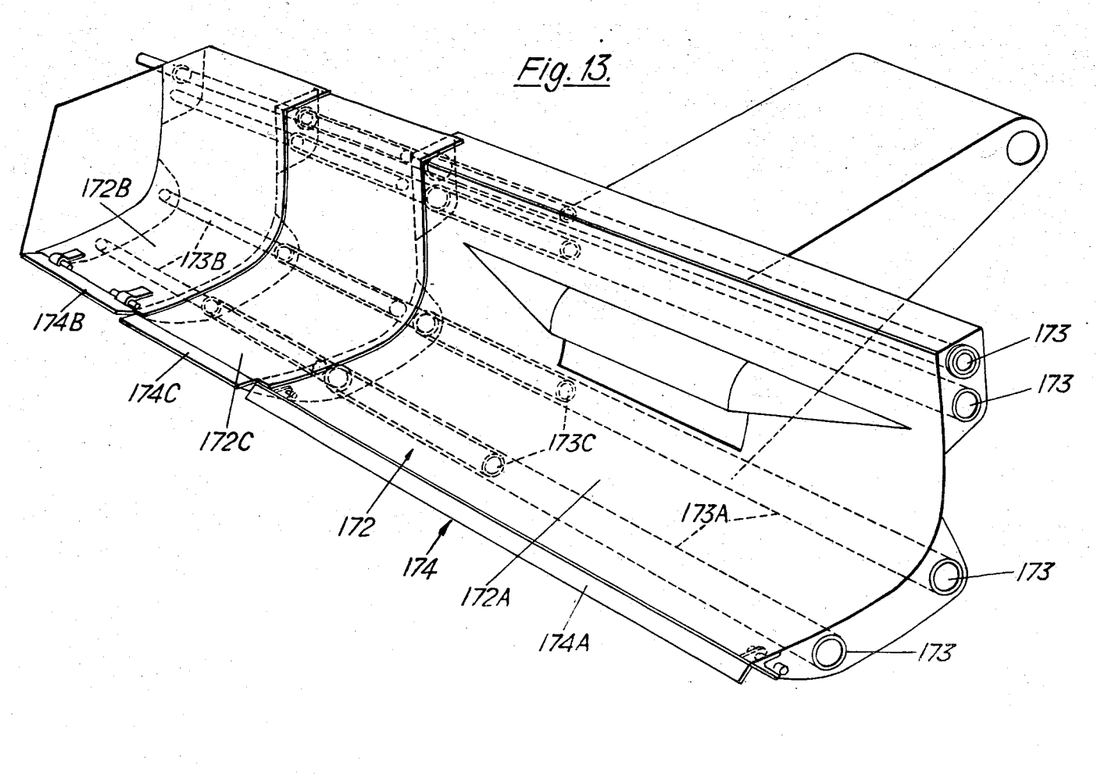
FIG. 13 is a perspective view of a fourth embodiment with the reel and auger omitted.

In the embodiment shown in FIG. 13, the table 172 of the header has a main portion 172A, and, at one end, portion 172B and an intermediate portion 172C. In the fully extended position shown, the portion 172C slightly overlies the portion 172A, and the portion 172B slightly overlies the portion 172C, and, in the fully contracted position, the portion 172C lies fully over the portion 172A, and the portion 172B fully overlies the portion 172C. The portions 172A, 172B, 172C are supported and guided by shafts 173 having telescopic parts 173A, 173B, 173C secured respectively to the table parts 172A, 172B, 172C, and preferably running one within another on ball bearings. The table 172 has a cutter bar 174 which is correspondingly formed in parts 174A, 174B, 174C. As shown in the drawings, to enable telescoping of the header, the cutter part 174B is hinged upwards, and the part 172A is hinged downwards, while the part 172C remains fixed.

Figure 14:
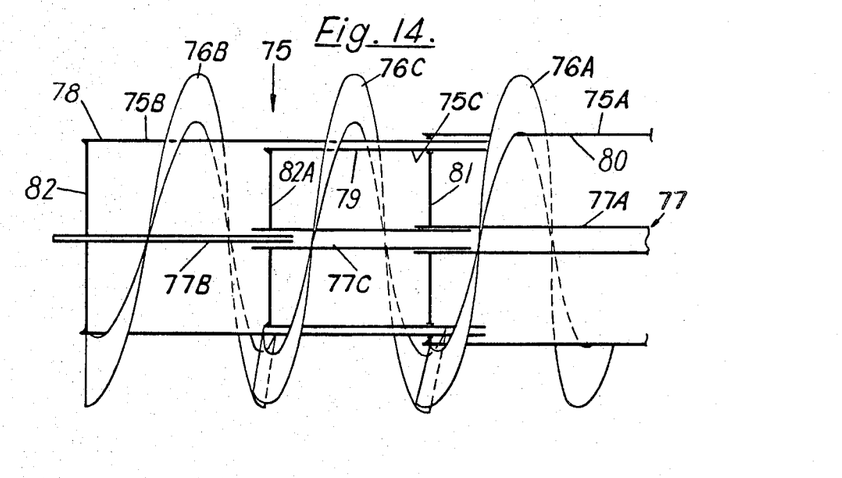
FIG. 14 is a fragmentary and more diagrammatic view of an auger for use with the header shown in FIG. 13.
Figure 15:
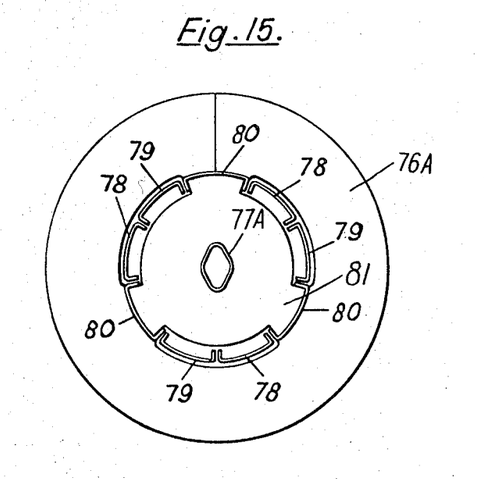
FIG. 15 is a sectional view corresponding to FIG. 14.

FIGS. 14 and 15 show very diagrammatically an auger 75 for use with the header described with reference to FIG. 13. The auger 75 has a main part 75A, and, at one end, an end part 75B and an intermediate part 75C corresponding to the table parts 172A, 172B, 172C. The part 75A has auger flights, 76A, the part 75B has an auger flight 76B, and the part 75C has an auger flight 76C. The auger 75 has a shaft 77 having telescopic parts 77A, 77B, 77C. The auger flight 76A is mounted on three peripheral spaced tabs 80 extending from end hub 81 of auger part 75A. Auger flight 76B is mounted on three arcuately spaced members 78, extending longitudinally from end hub 82 of auger part 75B, between tabs 80. Similarly, auger flight 76C mounts on three spaced members 79 extending longitudinally, from end hub 82A of auger part 75C, between tabs 80 and members 79. This arrangement permits the auger to contract telescopically, as diagrammatically in FIG. 14.

In a modification of the embodiment described with reference to FIGS. 13 and 15, a similar arrangement of table, auger and cutter parts is provided at both ends of the table.

Figure 16:
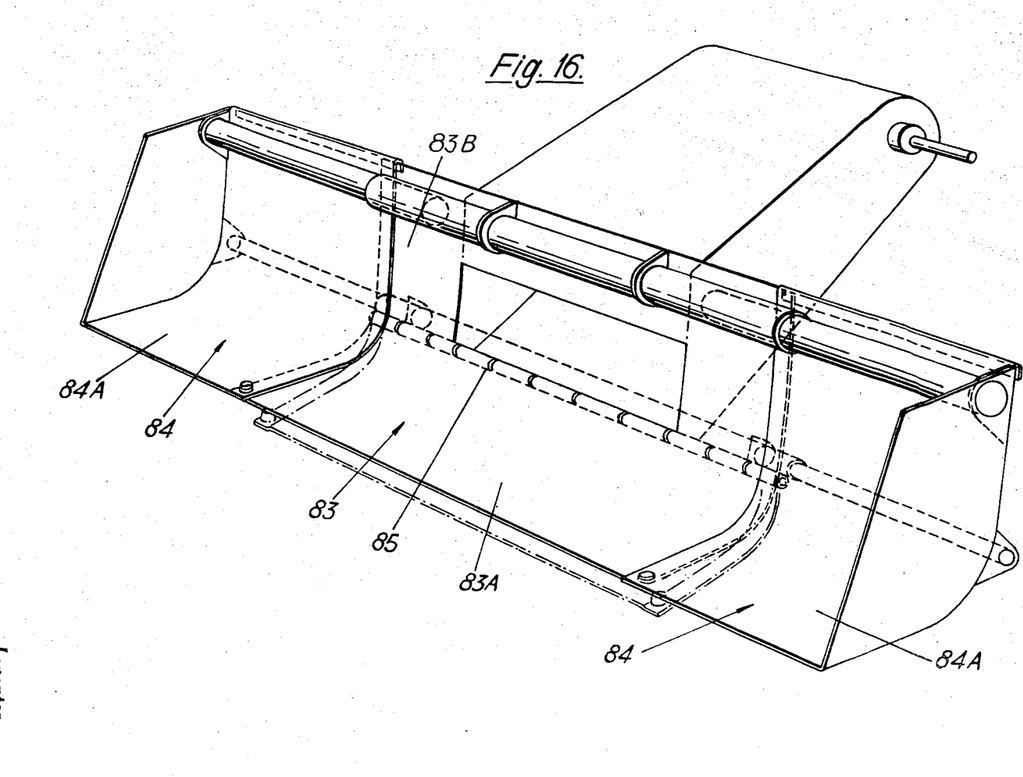
FIG. 16 is a perspective view of a fifth embodiment with the auger and reel omitted.
Figure 17:
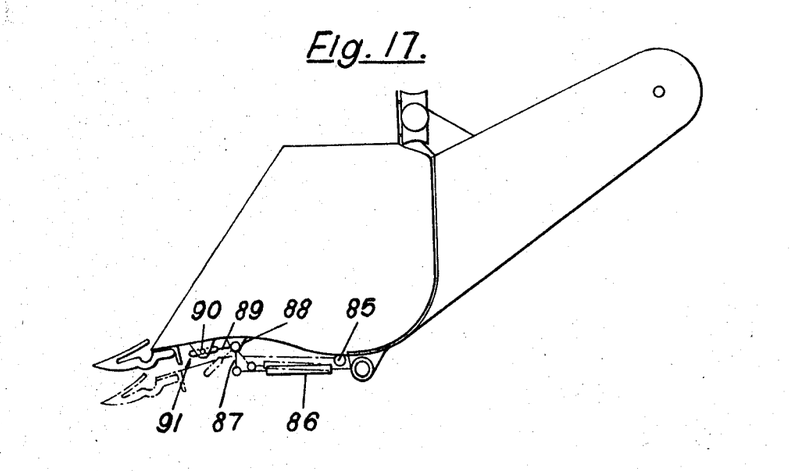
FIG. 17 is an end view corresponding to FIG. 16.

The fifth embodiment shown in FIGS. 16 and 17 is generally similar to the embodiments described with reference to FIGS. 1 and 12, the table having a main portion 83, and end portions 84 movable relative thereto from the extended position shown to a contracted position. In use, the floors 83A and 84A of the table portions 83, 84 may become dented or bent or otherwise deformed due to their striking stones on the ground, or due to stones or other foreign matter entering between the auger and the table, and, if this happens, it may be difficult or impossible to move the end portions 84 inwards to their contracted positions. In order to overcome this possible difficulty, the floor 83A is attached to the rear wall 83B of the portion 83 by a hinge 85, so that, prior to contraction of the table, the floor 83A may be hinged downwards slightly, to the position shown in phantom lines, to accommodate deformation in the floors.

In order to facilitate raising and lowering of the floor 83A, a hydraulic control system is provided. This has a hydraulic ram 86, FIG. 17, pivotally connected at one end to a fixed part of the table, and pivotally connected at its other end to one arm 87 of a bell crank lever. The latter is pivotally secured to a bracket 88 on the end portion 84A of the table, and its other arm 89 is connected to the floor 83A by a pin 90 on a bracket and engaging in an enlongated slot 91 in the arm 89. The pin 90 may extend across the floor 83A to another bracket at the other end. The supply piping for the ram is flexible so as to permit movement thereof with the end portion of the table. If necessary, a similar hydraulic control system may be provided at the other end of the table. With the arrangement of FIGS. 16 and 17, it is not necessary to hinge the cutter bar as with previous embodiments, since by simply disconnecting the knife at two points the cutter bar portions are moved out of the interference position by the hinging of the floor.

Some headers have a comb instead of a cutter, and, in such a header, it will be understood that the comb is made length-adjustable in a similar manner to that described with reference to the cutter 4.

In the above described embodiments adjustment of all the elements, except the cutter bar assembly, follows automatically upon adjustment of the table and the elements such as the auger and reel remain operable. Automatic adjustment of the cutter bar assembly also can be achieved by making the cutter bar assembly in separate sections each driven separately from its outer end and respectively mounted on the main and adjustable part or parts of the table, the separate sections being offset fore and aft and/or vertically so as to overlap when the table sections are telescoped. Thus, the cutter sections will remain operable and with this arrangement the telescoping of the header can be used to give different working widths, quite apart from considerations of transport width.

What is claimed is:

1. An adjustable header for a harvester, including: a table, crop gathering means, and crop conveying means, said table, crop gathering means and crop conveying means being laterally width-adjustable to enable transverse movement of the header between an extended use position and a contracted road transport position.

2. A header as claimed in claim 1, in which the table has a relatively fixed main portion, an end portion, and a portion intermediate the end and main portions, the end portion being slidable relative to the intermediate portion, and the latter being slidable relative to the main portion to the contracted position, the crop gathering means and the crop conveying means having corresponding main, end and intermediate parts.

3. A header as claimed in claim 2, including a cutter bar assembly having main, intermediate and end parts, the intermediate part being relatively fixed, and the main and end parts are pivotable downwardly and upwardly respectively to position clear of the main part.

4. A header as claimed in claim 1, in which the table has a relatively fixed main portion, and an end portion slidably mounted on the main portion for movement between the extended and contracted positions.

5. A header as claimed in claim 4, in which the end portion of the table is mounted on the main portion by rods which pass slidably between spaced pairs of rollers on the main portions.

6. A header as claimed in claim 4, including a hydraulic ram for effecting movement of the end portion of the table.

7. A header as claimed in claim 4, in which crop conveying means comprise an auger having telescopic main and end parts, the main part being mounted on the main portion of the table, and the end part being mounted on the end portion of the table and being movable therewith between the extended and contracted positions.

8. A header as claimed in claim 7, in which the auger has a telescopic shaft of which one part is of hexagonal cross section, and the other part is hollow and carries rollers which bear on alternate faces of the hexagonal shaft.

9. A header as claimed in claim 7, in which one of the telescopic parts of the auger has spaced hub parts which are slidably located between similar hub parts on the other part of the auger.

10. A header as claimed in claim 4, including a cutter bar assembly comprising a main cutter bar part on the end portion of the table, the end cutter bar part being upwardly pivotable to a position in which it lies clear of the main part so that the header may be adjusted to its contracted position.

11. A header as claimed in claim 4, in which the crop gathering means include a reel having a central shaft, a main part on the main portion of the table, and an end part on the end portion of the table, a plurality of bars, the central shaft of the reel being telescopic, and the bars of the reel comprising bars on the end part which are slidable relative to bars on the main part between the extended and contracted positions.

12. A header as claimed in claim 11, in which the bars of one of the parts are of channel section with in-turned flanges, and the bars of the other part are of channel section with out-turned flanges and fit within the first-mentioned bars, ball bearings being located between said flanges.

13. A header as claimed in claim 12, in which the parts of the bars are made of metal and have longitudinally spaced pairs of outwardly projecting vertically spaced lugs with inwardly convergent side walls over which looped portions of tines are sprung.

14. A header as claimed in claim 11, including holding means for positively holding the reel in the extended and contracted positions.

15. A header as claimed in claim 14, wherein the holding means include holes formed in the parts of the central shaft of the reel which can be brought into register to receive a pin, so that the reel may be positively held in the contracted or extended positions.

16. A header as claimed in claim 11, in which the reel has bars, a main part on the main portion of the table, a spider on the main part of the reel, and an end part of the reel being angularly spaced from the bars of the reel and being supported and guided at one end in eyes in the spider.

17. An adjustable header for a combine including: a table having a main portion and two end portions laterally width-adjustable relative thereto, a reel having a main part and two end parts laterally width-adjustable relative thereto, an auger having a main part and two end parts width-adjustable relative thereto, and a cutter bar assembly having a main part and two end parts adjustable relative thereto, thereby enabling transverse movement of the header between an extended use position and a contracted use position.

18. A header as claimed in claim 17, in which at least one of the table portions is movable in a direction relative to the other portions to provide more clearance therebetween during width-adjustment.

19. A header as claimed in claim 17, in which the main part of the cutter bar is pivotable downwards to a position in which it lies clear of the end parts of the cutter bar.

20. A header as claimed in claim 17, in which the floor of the main portion of the table is hingedly mounted so that it may be lowered relative to the floors of the other portions prior to width-adjustment of the header.

21. A header as claimed in claim 20, in which a hydraulic ram is provided for effecting movement of said floor.

22. A header as claimed in claim 1, in which the reel has a central shaft and bars formed in parts which are relatively movable so that the reel may be contracted to a length suitable for road transport.

23. A header as claimed in claim 1, in which the auger is telescopic so that it may be contracted to a length suitable for road transport.

References Cited
UNITED STATES PATENTS

| | | | |
|---|---|---|---|
| 3,258,901 | 7/1966 | Van der Lely et al. | 56—20 |
| 3,468,107 | 9/1969 | Van der Lely | 56—23 |

ANTONIO F. GUIDA, Primary Examiner

U.S. Cl. X.R.

56—221, 319